US011116151B2

(12) United States Patent
Hasday et al.

(10) Patent No.: US 11,116,151 B2
(45) Date of Patent: Sep. 14, 2021

(54) CLOG RESISTANT IN-LINE VORTEX ELEMENT IRRIGATION EMITTER

(71) Applicant: DLHBOWLES, INC., Canton, OH (US)

(72) Inventors: Benjamin D. Hasday, Baltimore, MD (US); Gregory A. Russell, Catonsville, MD (US); Shridhar Gopalan, Westminster, MD (US); Christopher F. South, Washington D.C., DC (US)

(73) Assignee: DLHBOWLES, INC., Canton, OH (US)

( * ) Notice: Subject to any disclaimer, the term of this patent is extended or adjusted under 35 U.S.C. 154(b) by 94 days.

(21) Appl. No.: 16/001,432

(22) Filed: Jun. 6, 2018

(65) Prior Publication Data

US 2018/0343813 A1     Dec. 6, 2018

Related U.S. Application Data

(60) Provisional application No. 62/515,973, filed on Jun. 6, 2017.

(51) Int. Cl.
    *A01G 25/02*     (2006.01)
(52) U.S. Cl.
    CPC ................. *A01G 25/023* (2013.01)
(58) Field of Classification Search
    CPC ........ F15C 1/16; F15C 1/02; Y10T 137/2093; A01C 23/02; A01C 23/023; B01F 13/0066; F16K 47/08; F16K 47/10
    See application file for complete search history.

(56) References Cited

U.S. PATENT DOCUMENTS

| 3,323,550 | A | 6/1967 | Lee et al. |
| 3,780,946 | A | 12/1973 | Smith |
| 4,226,368 | A | 10/1980 | Hunter |
| 5,628,462 | A | 5/1997 | Miller |

(Continued)

FOREIGN PATENT DOCUMENTS

| WO | WO2007046105 | 4/2007 |
| WO | 201583032 | 6/2015 |

OTHER PUBLICATIONS

International Searching Authority, European Patent Office; International Search Report and Written Opinion for PCT/US2018/036255, dated Sep. 13, 16 pages.

*Primary Examiner* — Tuongminh N Pham
(74) *Attorney, Agent, or Firm* — McDonald Hopkins LLC

(57) ABSTRACT

A clog resistant in-line vortex emitter and drip irrigation assembly and method uses a double-sided circuit and a series of vortex chambers of optimized dimensions to create a pressure drop with large dimensions and good clog resistance. The vortex chamber 100 also al lows for a lower exponent than traditional circuits. This gives a pressure regulating property to the no-moving-parts circuit. The vortex emitter allows for some pressure regulation without sacrificing recyclability or requiring moving parts. The vortex circuit of the present disclosure is optimized for an emitter efficiency Ef value wherein $Ef=(k/Ackt)*Amin$ such that k is a unitless head loss coefficient, Ackt is the area of the circuit, and Amin is the minimum cross sectional area of the circuit. A higher k per a given area with larger dimensions allows for a smaller part with a lower chance of clogging.

17 Claims, 14 Drawing Sheets

(56) References Cited

U.S. PATENT DOCUMENTS

| | | | |
|---|---|---|---|
| 7,520,661 B1 * | 4/2009 | Lawson | B01F 5/0604 138/42 |
| 2005/0284966 A1 | 12/2005 | DeFrank | |
| 2010/0200676 A1 | 8/2010 | Allen | |
| 2012/0305676 A1 | 12/2012 | Keren | |
| 2017/0065990 A1 | 3/2017 | Gopalan et al. | |

* cited by examiner

CLOG RESISTANT IN-LINE VORTEX ELEMENT IRRIGATION EMITTER

CROSS-REFERENCE TO RELATED APPLICATIONS

This application claims priority to and benefit of U.S. Provisional Application No. 62/515,973 entitled "CLOG RESISTANT IN-LINE VORTEX ELEMENT IRRIGATION EMITTER," filed on Jun. 6, 2017, which is hereby incorporated by reference in its entirety.

FIELD OF THE DISCLOSURE

The present disclosure pertains generally to devices for use as drip irrigation emitters. More particularly, the present disclosure pertains to drip irrigation emitters that provide a substantially constant drip flow-rate over a wide range of line pressures. The present disclosure is particularly, but not exclusively, useful as a self-cleaning, pressure compensating, irrigation drip emitter optimized for assemblies having multiple irrigation drip emitters mounted to a supply tube to form an irrigation assembly or system.

BACKGROUND

Drip emitters are commonly used in irrigation systems to convert water flowing through a supply tube at a relatively high flow rate to a relatively low flow rate at the outlet of each emitter. Each drip emitter generally includes a housing defining a flow path that reduces high pressure water entering the drip emitter into relatively low pressure water exiting the drip emitter. Multiple drip emitters are commonly mounted on the inside or outside of a water supply tube. In one type of system, a large number of drip emitters are mounted at regular and predetermined intervals along the length of the supply tube to distribute water at precise points to surrounding land and vegetation. These emitters may either be mounted internally (i.e., in-line emitters) or externally (i.e., on-line or branch emitters). Some advantages to in-line emitters are that the emitter units are less susceptible to being knocked loose from the fluid carrying conduit and the conduit can be buried underground if desired (i.e., subsurface emitters) which further makes it difficult for the emitter to be inadvertently damaged (e.g., by way of being hit or kicked by a person, hit by a lawnmower or trimmer, etc.).

In addition to the advantages of in-line emitters, subsurface drip emitters provide numerous advantages over drip emitters located and installed above ground. First, they limit water loss due to runoff and evaporation and thereby provide significant savings in water consumption. Water may also be used more economically by directing it at precise locations of the root systems of plants or other desired subsurface locations. Second, subsurface drip emitters provide convenience. They allow the user to irrigate the surrounding terrain at any time of day or night without restriction. For example, such emitters may be used to water park or school grounds at any desired time. Drip emitters located above ground, on the other hand, may be undesirable at parks and school grounds during daytime hours when children or other individuals are present. Third, subsurface emitters are not easily vandalized, given their installation in a relatively inaccessible location (i.e., underground). And fourth, the use of subsurface drip emitters can prevent the distribution of water to undesired terrain and the use of subsurface drip emitters prevents undesirable "overspray." In contrast, above-ground emitters often generate overspray that disturbs vehicles and/or pedestrians.

Although some advantages of subsurface emitters are described above, it would be desirable to provide an improved in-line drip emitter design that can be used in both subsurface and above ground applications. For both applications, there is a need to provide for a relatively constant water output from each of the emitters in the irrigation system. More specifically, it is desirable to provide pressure compensation so as to ensure that the flow rate of the first emitter in the system is substantially the same as the last emitter in the system. Without such flow rate compensation, the last emitter in a series of emitters will experience a greater pressure loss than the first. Such pressure loss results in the inefficient and wasteful use of water.

Flow rate compensation has been offered in prior art drip irrigation assemblies (such as U.S. Pat. No. 4,226,368 (Hunter)) which discloses an assembly with multiple chambers or circuits providing interconnected vortices, but the flows are poorly controlled and not optimized to generate the flows preferred for many drip irrigation applications in that certain critical dimensions cannot be adapted in a manner which allows for the circuits to be scaled.

Traditional prior art drip emitters containing moving parts and pressure compensating flexible membranes have one side of the membrane exposed to irrigation line pressure, while the opposite side of the membrane is exposed to a reduced pressure. For example, the reduced pressure can be created by forcing a portion of the water from the irrigation line through a restrictor or labyrinth. This pressure differential on opposite sides of the membrane causes the flexible membrane to deform. In particular, the higher line pressure can be used to force the flexible membrane into a slot where reduced pressure water is flowing. As the line pressure increases, the membrane will be pressed further into the slot, decreasing the effective cross-section of the slot and thus restricting flow through the slot. As described further below, the result is a relatively constant flow through the emitter over a range of line pressures. Unfortunately, the slot is subject to clogging in the same fashion as the simple orifice emitter. Further, the membrane is required to form a seal with the edge of the slot confining flow to the slot. Unfortunately, particulate buildup may also interfere with the membrane seal causing non-uniform flow.

One attempt to solve the problems associated with particulate buildup in a pressure compensating emitter uses the reduced-pressure water from the labyrinth to clean the slot and sealing surfaces during initial pressurization of the irrigation line. In particular, such an emitter is disclosed by Miller in U.S. Pat. No. 5,628,462 which issued May 13, 1997, entitled "Drip Irrigation Emitter," in which a chamber is created between the slot and the membrane. For the emitter disclosed by Miller, during initial pressurization of the irrigation line, while the membrane is only slightly deformed, the chamber is flushed with reduced-pressure water delivered from the restrictor or labyrinth. As the line pressure increases, the membrane deforms, sealing off the chamber from reduced pressure water, and restricting flow through the slot. The above cited prior art references are useful to set forth the nomenclature of drip emitter assemblies and components, and so are incorporated by reference in their entireties for that purpose and for enablement. The prior art drip emitters are not as effective and economical as is desired and there is a need for an economical, scalable, effective fluidic equipped drip irrigation devices suitable for the purposes of providing a constant drip flow in response to a varying line pressure that reduces risk of clogging.

SUMMARY

Accordingly, it is an object of the present disclosure to overcome the above mentioned difficulties by providing a clog resistant in-line vortex element irrigation emitter or irrigation dripper which is easy to use, relatively simple to manufacture, and comparatively cost effective to install, and over its life cycle. The vortex emitter structure of the present disclosure may be designed to be injection molded as a component and then inserted into an extruded tube as part of a drip irrigation system. The drip irrigation assembly's tube may be placed in a farm field and fluid may be pumped in. The emitters take the high pressure and flow inside the tube and produce a desired flowrate (selectable depending on the requirements of the environment, terrain or plant being irrigated). The vortex emitter of the present disclosure has a higher efficiency than traditional pivot or sprinkler systems. The emitters not only provide the appropriate pressure attenuation; they resist clogging from the grit and debris in available ground water.

In accordance with the present disclosure, a newly developed prototype clog resistant in-line vortex element irrigation emitter gives a greater pressure attenuation for its physical dimensions than comparable devices in the prior art (as described above). The large dimensions and the vortex created in each chamber help flush debris and grit through the system. The circuit of the present disclosure is also optimized to take up the smallest space possible. The smaller circuit package along with the natural coring that occurs with the vortex circuit of the present disclosure saves on circuit mass. This saves irrigation assembly cost, and allows for parts to be used in thinner walled tubing as thinner wall tubing requires a smaller mass to heat for bonding circuits.

The vortex circuit of the present disclosure includes inherent pressure regulation and that pressure regulation may be describe as an optimized exponent. The exponent of an optimized vortex circuit of the present disclosure may be as low as 0.3 versus a standard (prior art) orifice which has an exponent of 0.5. What this means for the flow is that as the pressure increases along the inlet of the drip emitter, the flow only increases a small amount at the outlet of the drip emitter. As noted above, prior art drip emitters use gaskets as a pressure compensation device in alignment with the tortuous drip emitter path. Pressure compensation gives an exponent of 0 wherein any change in pressure, the circuit does not increase in flow. The vortex circuit of the present disclosure, without a pressure compensation device, does not get to such a low exponent, but it makes up for this as it does not require a rubber gasket. In the relevant range of irrigation fluid pressures and flows, the 0.3 exponent may be sufficient to prevent over-watering plants. The design of the present disclosure does allow for the optional use of a pressure compensating device. The instant disclosure does allow for a pressure compensation device to be added, but for naturally flowing circuits with no pressure compensation device, the low exponent of the vortex offers a nice blend of flow control and cost in a non-pressure compensation device part.

A filter component may be provided, such as a 3D filter, or filter positioned along an assembly housing, which may be used with the disclosed circuit to collect water from the bulk flow within the irrigation tube or pipe. The clog-resistant inline vortex emitter of the present disclosure may sits along or above the bottom of the irrigation fluid tube or pipe which can see significant settling of debris and grit. The position of the filter may help remove grit through gravity. The vortex circuit may include large dimensions for a given pressure drop per area of circuit when compared with typical emitters. The large dimensions and the vortex created in each chamber help clear grit and debris from the system.

BRIEF DESCRIPTION OF THE DRAWINGS

The operation of the present disclosure may be better understood by reference to the following detailed description taken in connection with the following illustrations, wherein.

DETAILED DESCRIPTION

Figure 1:
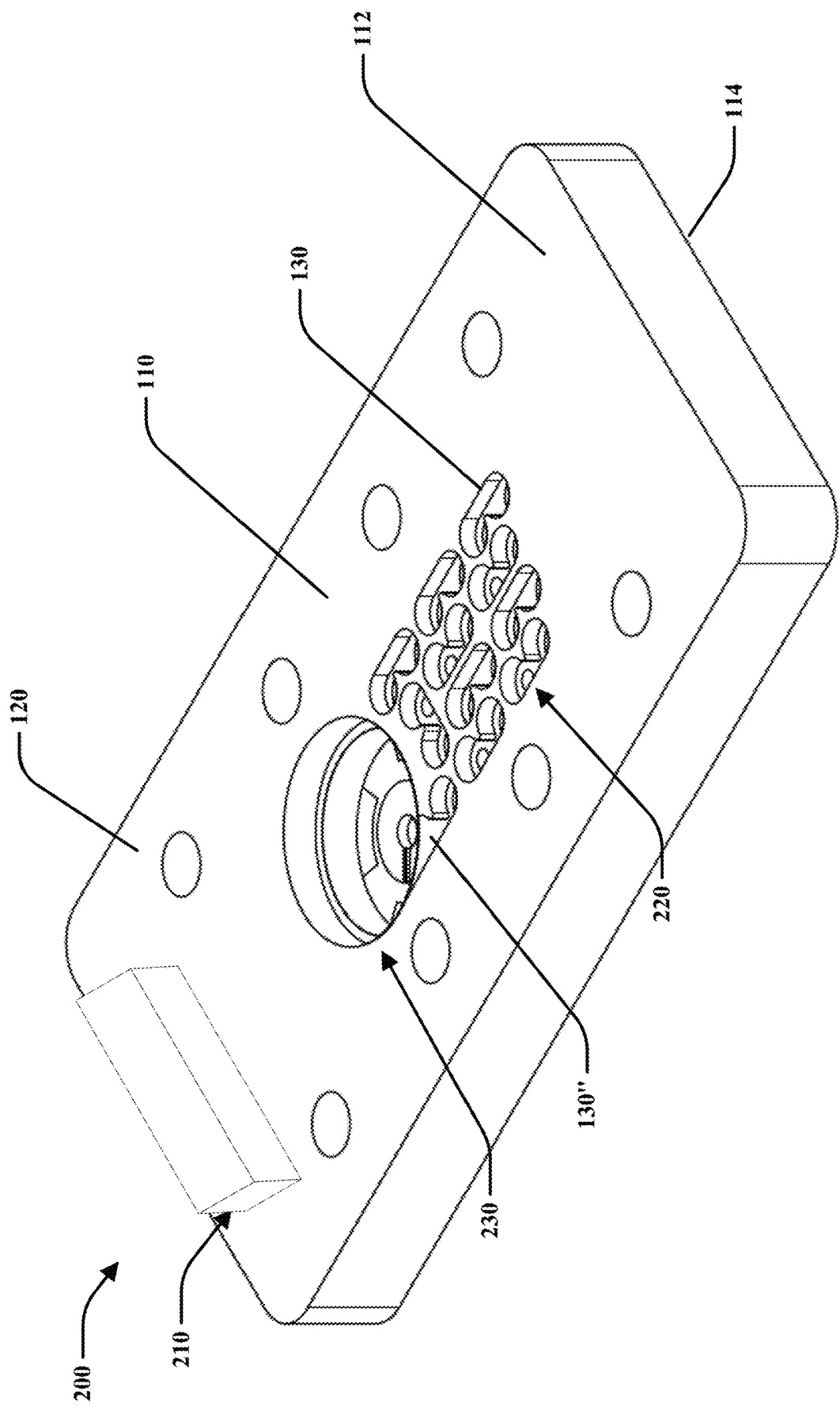
FIG. 1 is a top perspective view of an embodiment of a vortex emitter insert member having a plurality of the vortex emitter chambers in accordance with the present disclosure.
Figure 2:
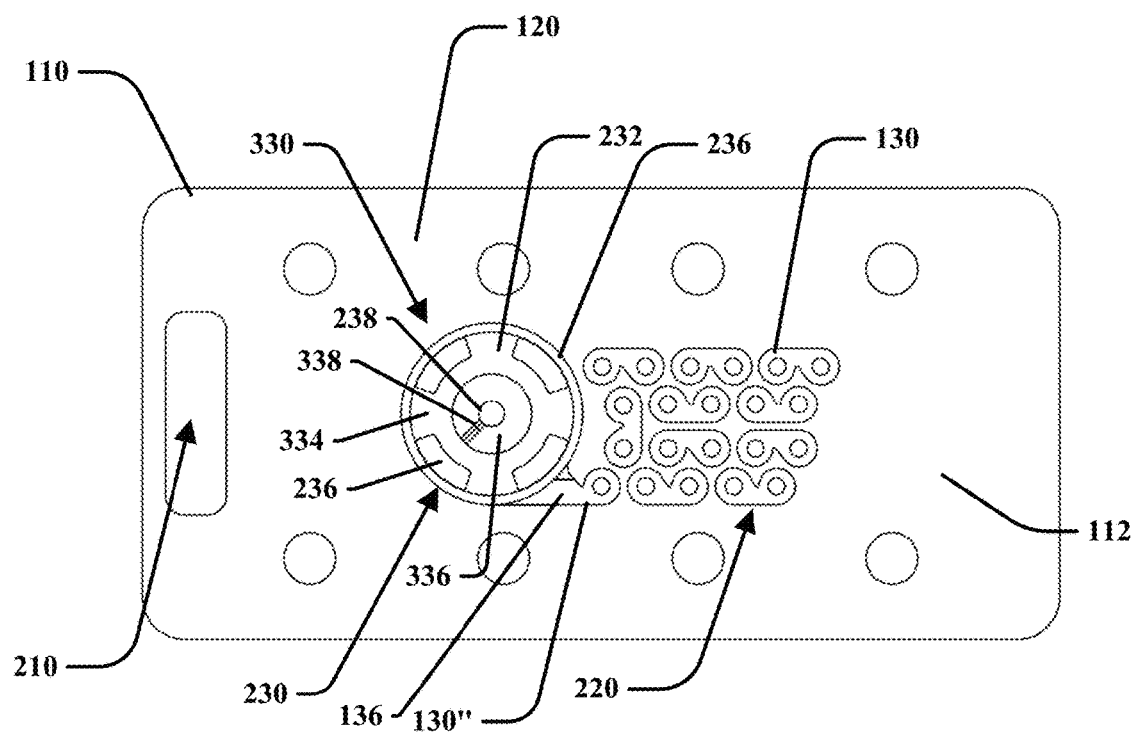
FIG. 2 is a top view of an embodiment of the vortex emitter insert member having a plurality of the vortex emitter chambers in accordance with FIG. 1.

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the system or assembly may be identical in all of the figures. In the same manner, while a particular aspect of the disclosure is illustrated in these figures, other aspects and arrangements are possible, as will be explained below.

Provided is an embodiment of a clog resistant in-line vortex irrigation emitter assembly 100 and its components parts. In one embodiment, the vortex emitter assembly 100 includes a vortex emitter circuit 110 wherein the assembly defines an inlet, an outlet and a flow channel therebetween providing fluid communication between the inlet and the outlet. An embodiment of the vortex emitter assembly 100 is illustrated in FIGS. 8-15 and may be configured to include a vortex emitter circuit 110 as illustrated in FIGS. 1-5. The vortex emitter circuit 110 may be defined to include a unitary body 120 with a double-sided surface having a plurality of single or individual vortex chambers 130, (further illustrated in FIGS. 6 and 7) with flow channel lumen dimensions optimized to create a pressure drop with large lumen dimensions and good clog resistance. The vortex circuit or vortex emitter of the present disclosure may be optimized for a dimensionless coefficient of emitter efficiency "Ef" wherein "Ef=(k/Ackt)*Amin." In this equation, k is a unitless head loss coefficient, Ackt is the total area of the circuit, and Amin is the minimum cross sectional area of the circuit. This measurement identifies if there is a relatively large head loss per unit area of the emitter assembly while achieving relatively good clog resistance to grit within the fluid.

The vortex emitter circuit 110 as illustrated by FIGS. 1-5 includes various sections including a filter component 210, a pressure reducing component 220 and a pressure compensating component 230. However, it should be appreciated that the emitter assembly 100 may be operable with the pressure reducing component 220 and the remaining portions are illustrated as use in only one optional embodiment of the present disclosure which is not limited herein. The filter component 210 may be any structural configuration that allows fluid to flow therethrough that may catch debris or other particulate prior to flowing through the assembly 100 and the circuit 110. The filter component 210 may have various structural configurations and may function to allow fluid to pass through an inlet of the assembly 100 while preventing relatively large grit or particulates located within the pressurized fluid flowing though the tube from entering the assembly 100. The pressure compensating component 230 may be a moveable device that modifies the pressure and flow of fluid through the assembly 100 in a particular manner in an effort to manage pressure of fluid flow therein. The pressure compensating component 230 may include a gasket or diaphragm 235 and its operation will be disclosed more fully herein.

Figure 6:
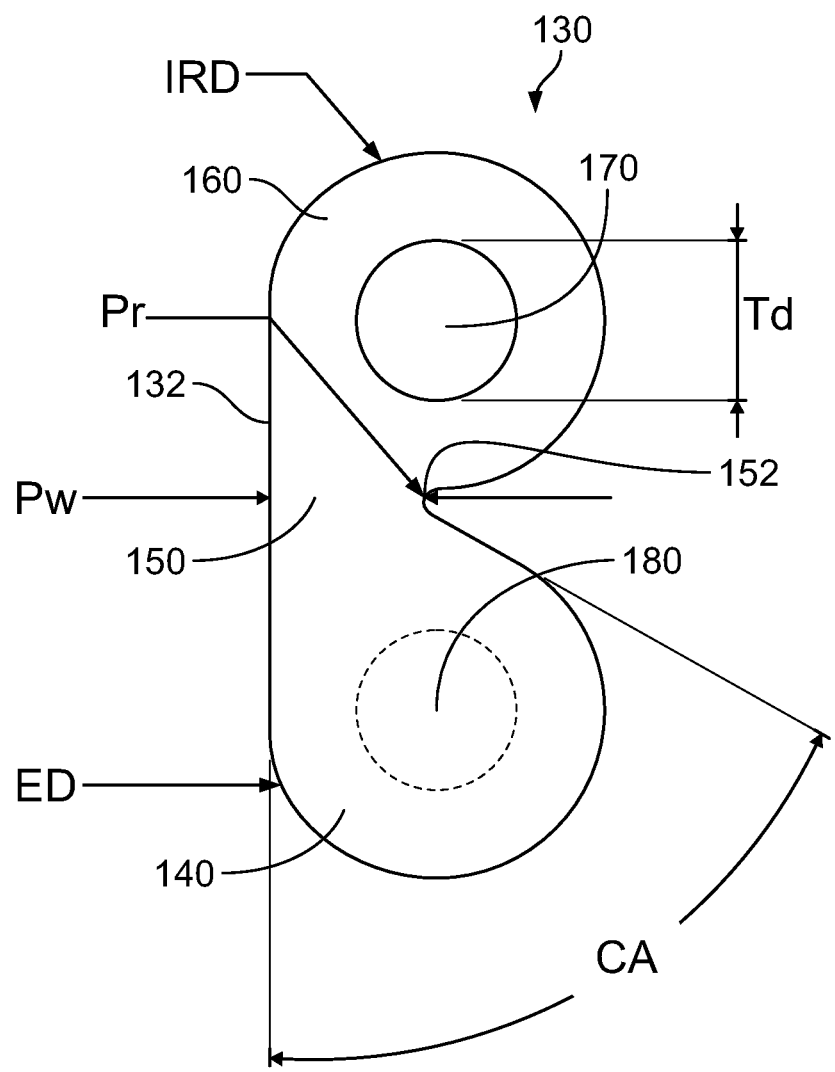
FIG. 6 is a top view, in elevation of a single vortex emitter chamber of the present disclosure.

The vortex emitter circuit 110 particularly includes a pressure reducing component 220 that includes a plurality of vortex chambers 130. Each vortex chambers 130 may defined by a wall 132 defining a fluid passageway and be aligned in an interconnecting pattern along a first surface 112 of the vortex emitter circuit 110 as well as a second opposite surface 114 of the vortex emitter circuit 110. As illustrated by FIG. 6, each vortex chamber 130 includes an inlet region 140, a power nozzle 150, and an interaction region 160 with an outlet 170. The inlet region 140 may include an inlet orifice 180 that is in communication with a different vortex chamber 130 aligned in series within the circuit 110. The outlet may be in communication with a different vortex chamber 130 aligned in series within the circuit 110. The inlet region 140 may be rounded about the inlet orifice 180 (if present) and be in fluid communication with the interaction region 160 through the power nozzle 150.

Figure 3:
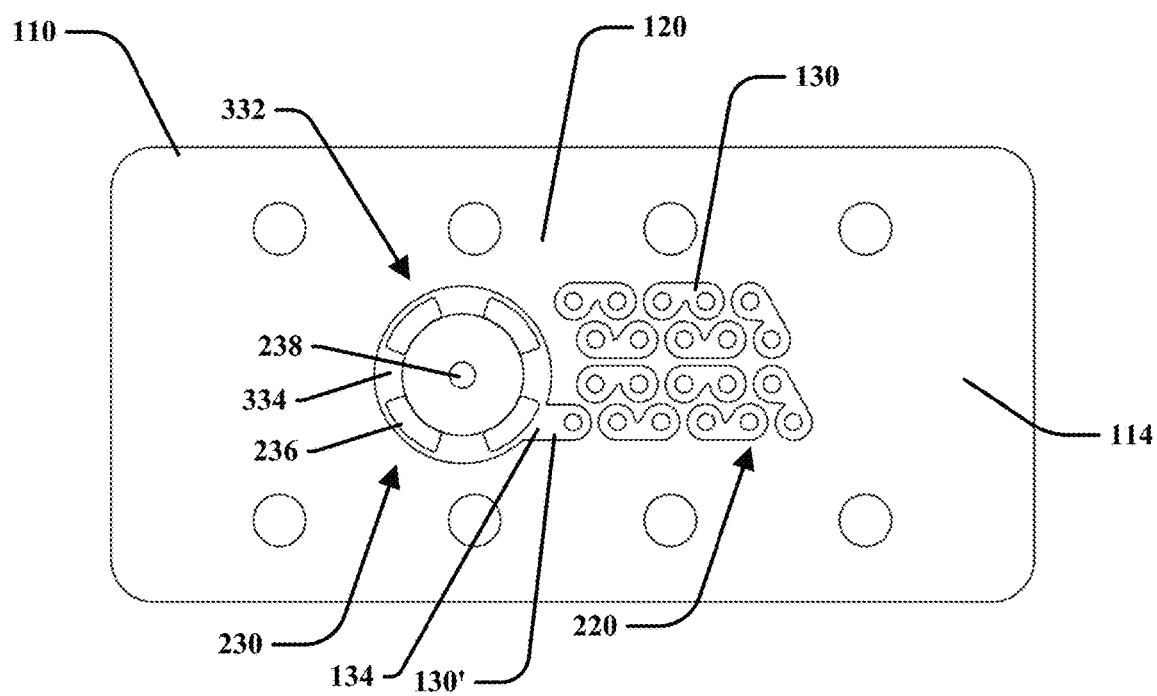
FIG. 3 is a bottom view of an embodiment of the vortex emitter insert member having a plurality of the vortex emitter chambers in accordance with FIG. 1.
Figure 4:
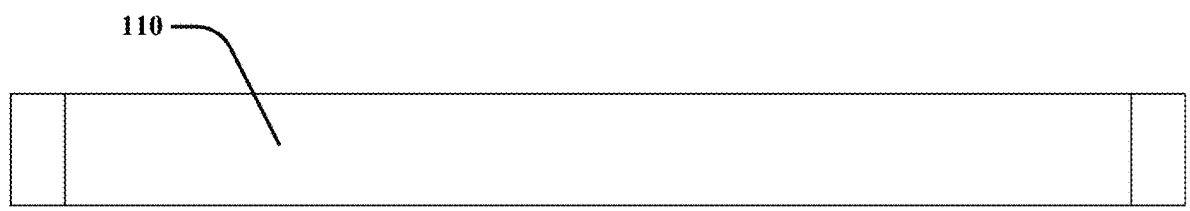
FIG. 4 is a side view of an embodiment of the vortex emitter insert member having a plurality of the vortex emitter chambers in accordance with FIG. 1.
Figure 5:
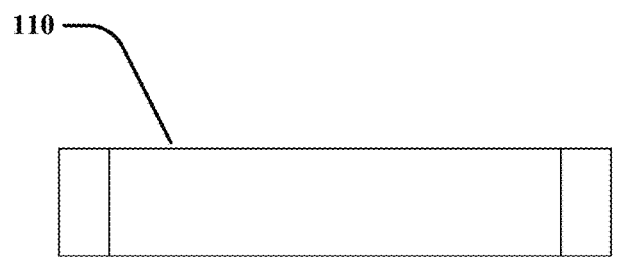
FIG. 5 is an end view of an embodiment of the vortex emitter insert member having a plurality of the vortex emitter chambers in accordance with FIG. 1.

The vortex chamber 130', of a plurality of vortex chambers 130, aligned in direct communication with an assembly outlet or a pressure compensating component 230 may not include an outlet 170 positioned through the unitary body 120 of the circuit 110 but otherwise may include a passage 134 in direct communication with the pressure compensating component 230 or assembly outlet (see FIG. 3). Similarly, if the vortex chamber 130" is in communication with an assembly inlet (such as a pressure compensating component 230 or filter component 210), the inlet region 140 may not include an inlet orifice 180 but otherwise include a passage 136 in direct communication with the pressure compensating component 230 or filter component 210.

A convergence angle CA may be measured from an apex 152 aligned along the wall 132 about the perimeter of the vortex chamber 130 at the power nozzle 150. The convergence angle CA includes a first side that extends from the wall 132 at the apex 152 along the inlet region 140 and a second side that extends from the wall 132 at an opposite side of the apex 152 along a generally straight line aligned with the inlet region 140, power nozzle 150 and interaction region 160 as illustrated by FIG. 6. The convergent angle CA may be a minimum angle of 45° but may be up to about 80°. In one embodiment, the convergent angle CA may be about 55°. If the convergence angle CA is too small and the pressure drop decreases while the area increases, this may decrease the emitter efficiency Ef value. If the convergent angle CA exceeds 80°, the flow conditioning may be such that the vorticity is reduced thereby reducing k more than Ackt, resulting in lower Ef values.

Further, the convergence angle CA may be modified to change the overall length of each vortex chamber 130. When arranging a plurality of vortex chambers 130 together in series, the convergence angle CA may be configured to allow for the closest possible spacing that manufacturing processes may allow. These processes may include molding but may also include others such as additive manufacturing or the like. The desired placement of vortex chambers 130 in an efficient use of space along the surfaces 112, 114 may increase the emitter efficiency Ef value of the assembly 100.

The power nozzle 150 may include a width Pw and a radius Pr. The dimension of the power nozzle radius Pr is desirable to be smaller to maintain a high velocity of fluid flow through the power nozzle 150. In one embodiment, this dimension may be as small as manufacturing constraints permit, such as between about 0.05 mm to about 0.3 mm or, in one embodiment, 0.07 mm. The power nozzle width Pw may be a minimum of 0.8 mm to avoid clogging. The configuration of the vortex chambers 130 may depend on the dimensions of the power nozzle 150 and incorporate ratios relative to the power nozzle width Pw. The outlet 170 (as well as the inlet 180) may include a throat diameter Td wherein the throat diameter Td may be at least 0.8 mm, but it is desired not to be much larger as otherwise vorticity may be reduced. The interaction region 160 includes an interaction region diameter IRD. In one embodiment the ratio of the throat diameter Td to the power nozzle width Pw may be about 1:1 additionally, the minimum interaction region diameter IRD to power nozzle width Pw ratio may be about 2:1 and the minimum interaction region diameter IRD to throat diameter Td ratio may also be about 2:1. In one embodiment, the interaction region diameter IRD to throat diameter Td ratio may be about 2.69:1 and include a range of 2.69+/−1.2 to 1.

The interaction region diameter IRD may be designed to be small enough that the area is reduced, but large enough the circuit 130 and fluid flowing therein creates a vortex in the interaction region 160. In one embodiment, the ratio for the dimension of the interaction region diameter IRD relative to the power nozzle width Pw is about 2.15:1 IRD:Pw. The range of this ratio may be 2.15 from about minus 0.15 to about plus 0.85 to 1.

The inlet region 140 may include an exit diameter ED. The exit diameter ED may be the same size as the interaction region diameter IRD. It may cause a small pressure drop as the flow goes from the inlet to the expanded area within the inlet region 140. A large exit diameter ED may allow the vortex chamber 130 to include a large convergence angle CA going into the subsequent vortex chamber 130 which may assist to keep the flow conditioning going into the vortex chambers 130.

Figure 7:
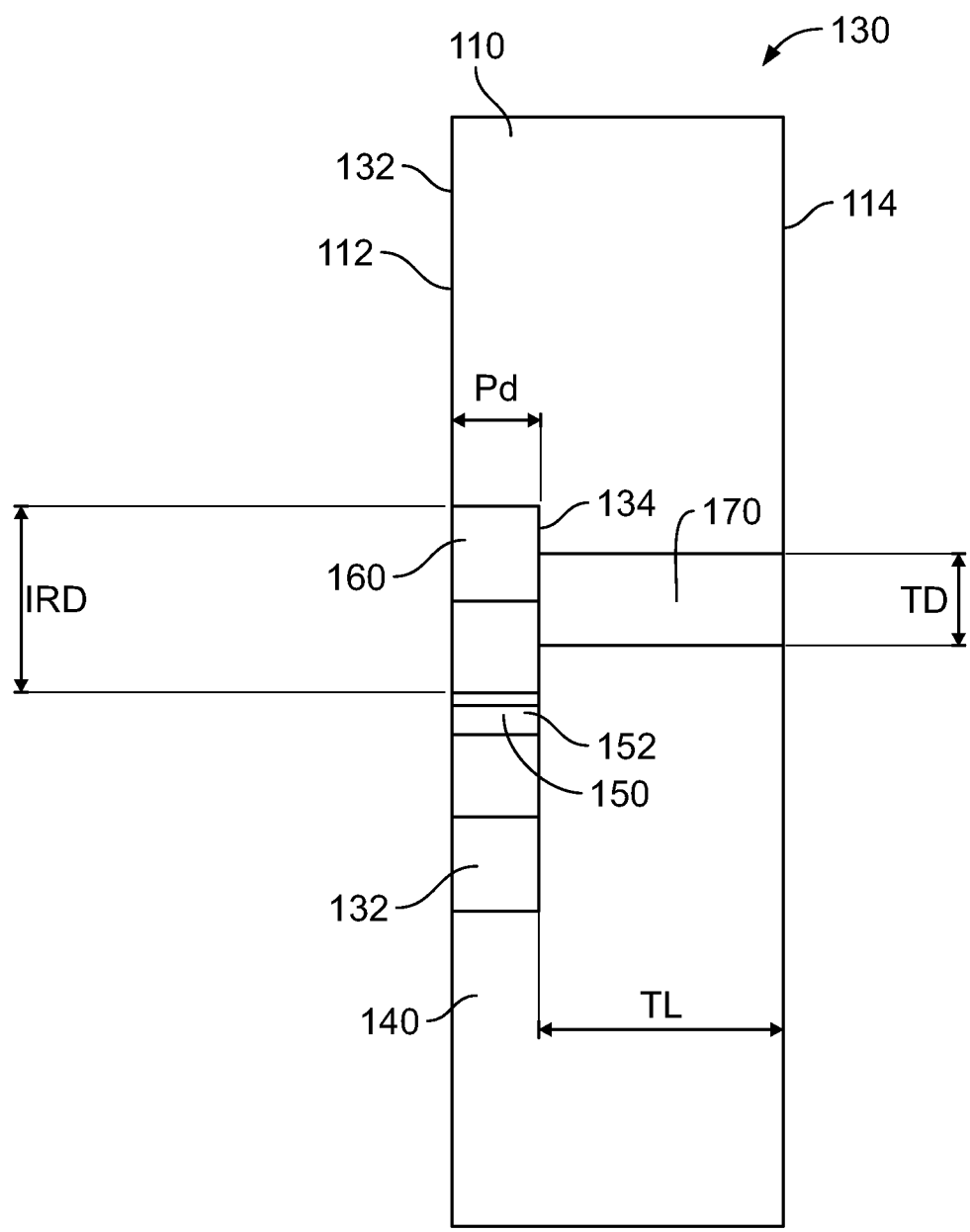
FIG. 7 is a side view, in elevation, of the vortex emitter chamber of FIG. 1, in accordance with the present disclosure.
Figure 8:
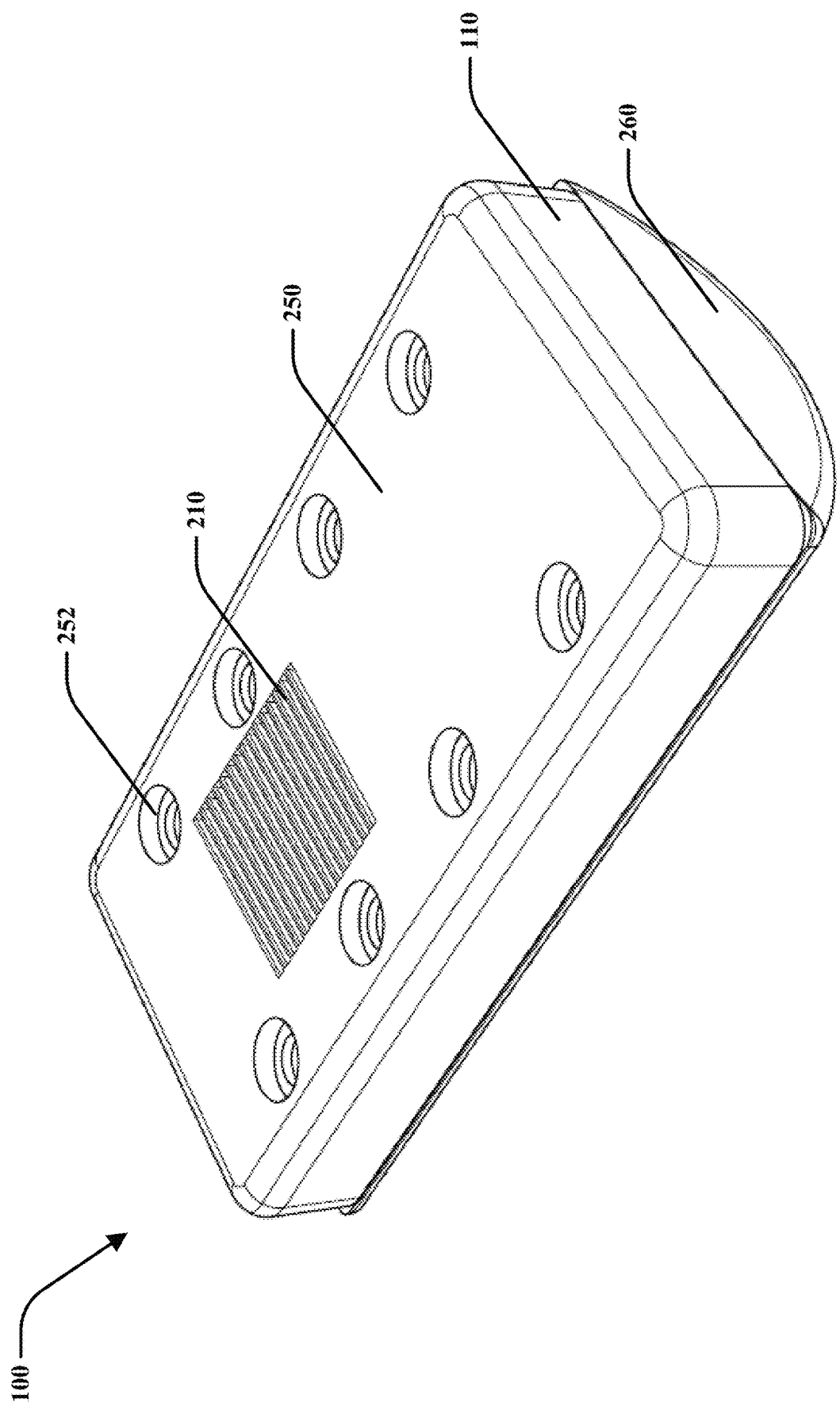
FIG. 8 is a perspective view of an embodiment of a vortex emitter assembly in accordance with one embodiment of the present disclosure.
Figure 9:
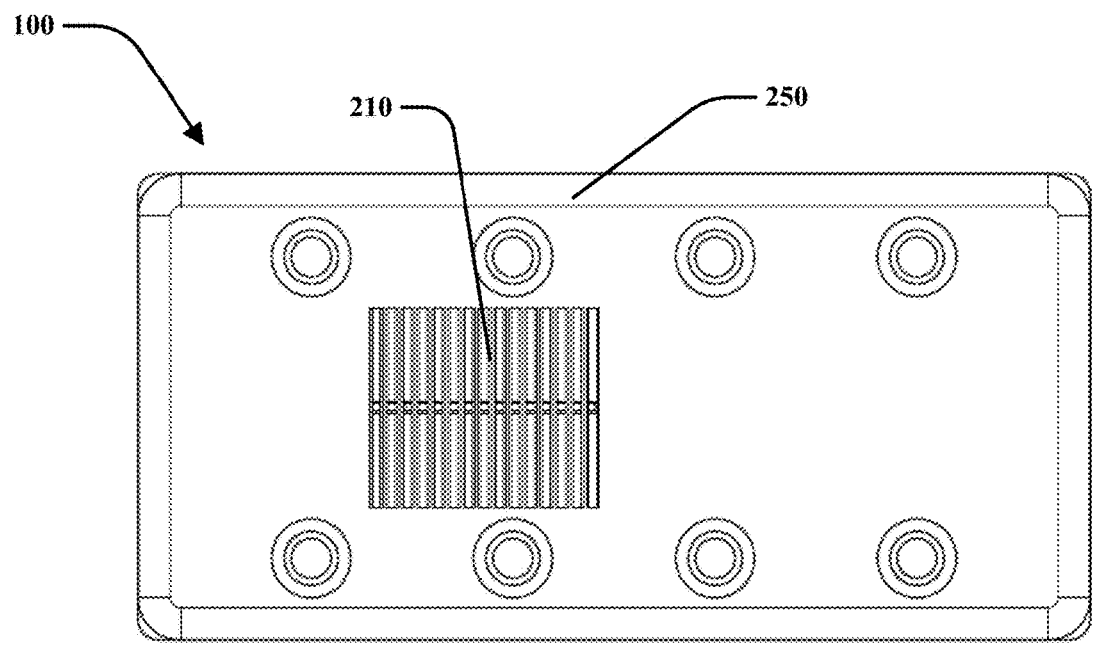
FIG. 9 is a top view of an embodiment of the vortex emitter assembly in accordance with one embodiment of the present disclosure of FIG. 8.
Figure 10:
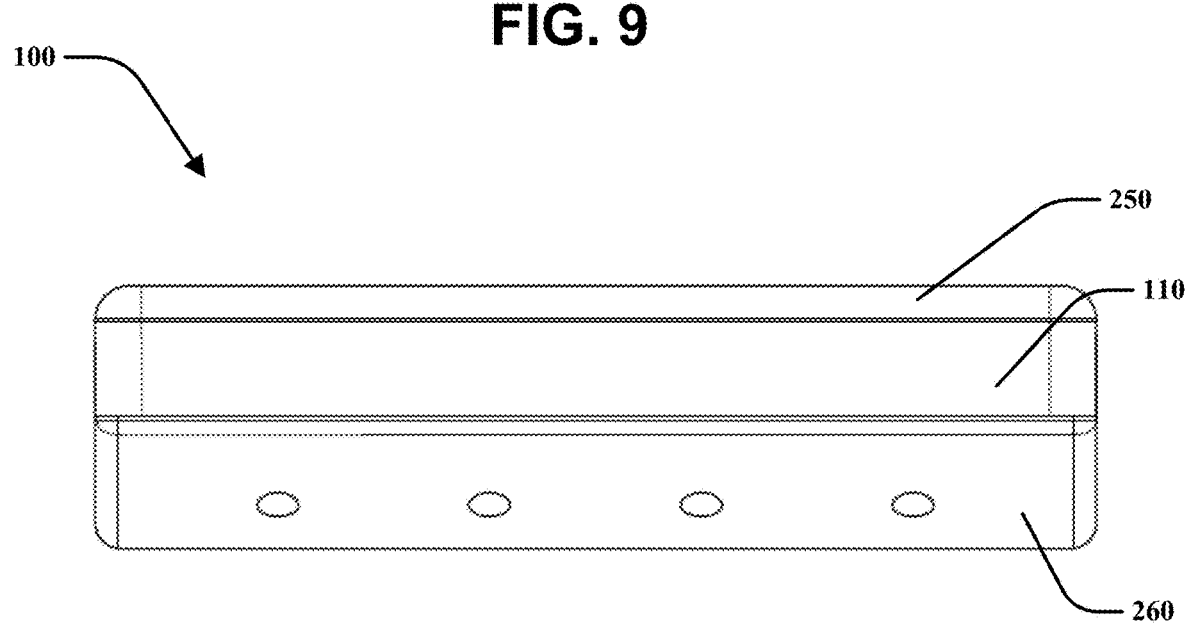
FIG. 10 is a side view of an embodiment of the vortex emitter assembly in accordance with one embodiment of the present disclosure of FIG. 8.
Figure 11:
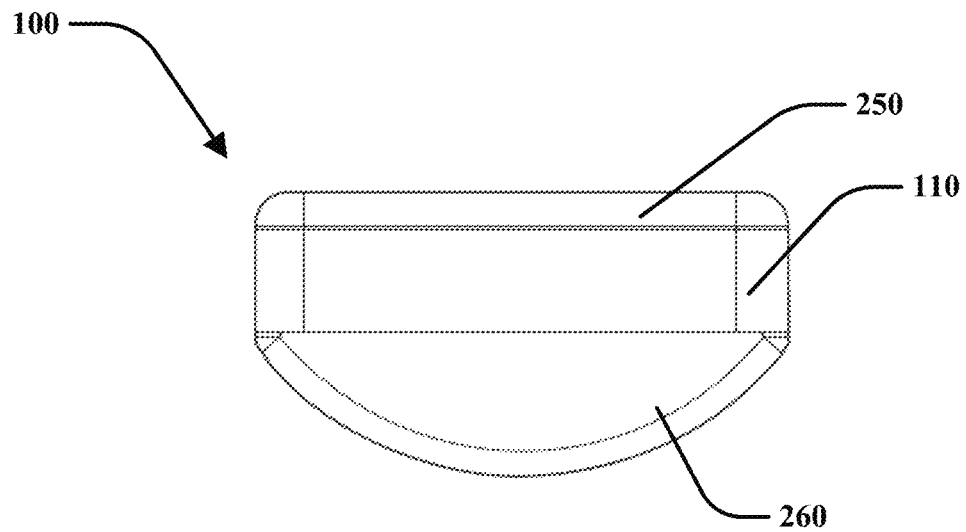
FIG. 11 is an end view of an embodiment of the vortex emitter assembly in accordance with one embodiment of the present disclosure of FIG. 8.
Figure 12:
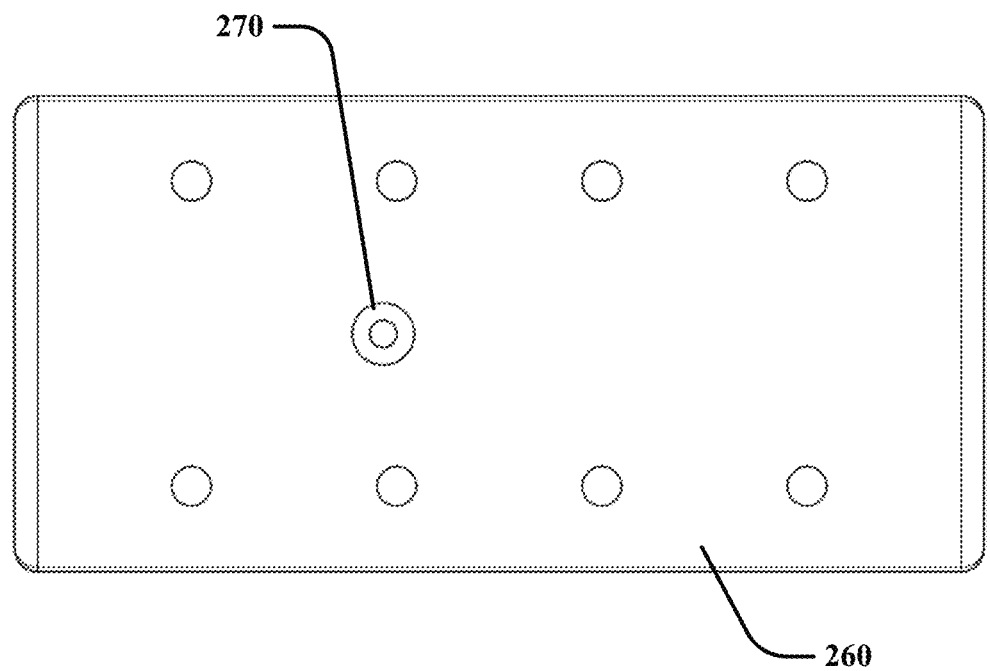
FIG. 12 is a bottom view of an embodiment of the vortex emitter assembly in accordance with one embodiment of the present disclosure of FIG. 8.
Figure 13:
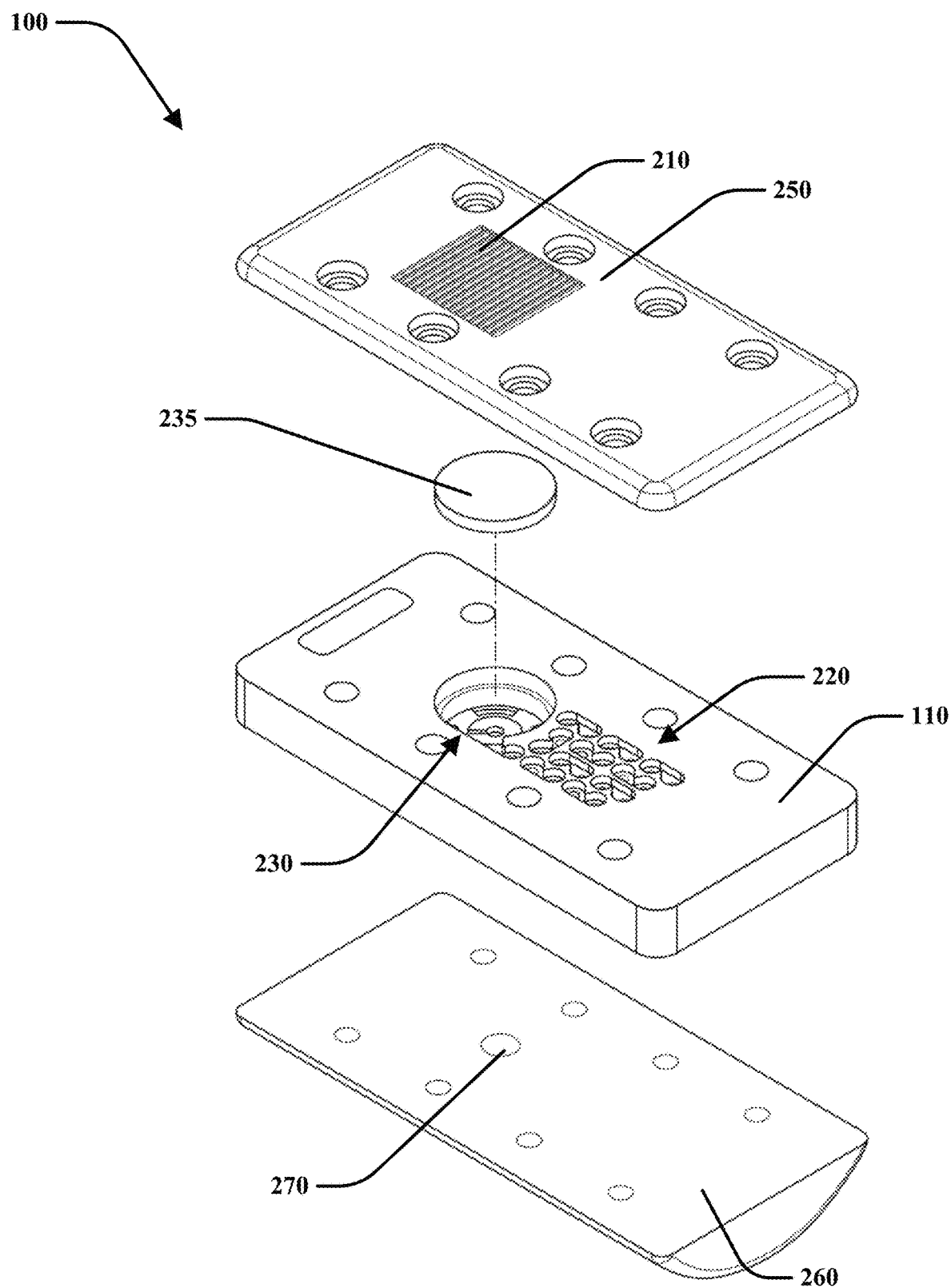
FIG. 13 is an exploded view of an embodiment of the vortex emitter assembly in accordance with one embodiment of the present disclosure of FIG. 8.

FIG. 7 illustrates a side view, in elevation, of the vortex emitter chamber 130 of FIG. 6, in accordance with the present disclosure. The power nozzle 150 includes a depth Pd that extends from a surface 132 of the circuit to a floor 134 of the circuit 110. In one embodiment, the circuit 110 may adopt the depth Pd of the power nozzle 150 to be about equal to the depth of the other component parts including the interaction region 160 and the inlet region 140. This configuration may provide a smooth transition of fluid flow from power nozzle 150 to interaction region 160. However, the depth of each component part may be varied and this disclosure is not limited in this regard. In one embodiment, the power nozzle depth Pd may also be equal to the power nozzle width Pw. The ratio of the power nozzle width Pw to the power nozzle depth Pd may be about 1:1 but may be in the range of 1+/−0.25 to 1. The power nozzle 150 may include a cross sectional shape formed into a square which may provide preferred flow conditioning into the interaction region 160 and may provide a preferred minimum dimension for the area of the power nozzle 150. Also illustrated is a throat length TL that extends from the floor 134 of the vortex chamber 130 to an opposing side of the circuit 110 which may be connected to another vortex chamber 130 positioned along the second side 114 of the circuit 110 described herein or may be a further pattern to allow for the fluid flow to communicate with either a filter component 210, a pressure compensating component 230 or an outlet/nozzle to spray fluid to environment.

The vortex emitter assembly 100 of the present disclosure works by taking the flow of fluid and passing it through a converging passage defined by a series of vortex chambers 130 aligned in series along either side of the circuit 110. This configuration has been found to increase the velocity of the flow and condition it to produce a better spin or vorticity. It has been found that the larger the power nozzle's initial linear velocity, the larger the interaction regions rotational or angular velocity. The larger the angular velocity, the larger the head loss Kl. This loss is due to the dissipation of kinetic energy by shear stress occurring between layers of rotating fluid. The dimensions of the convergence angle CA, the power nozzle width PW, the interaction region diameter IRD and the throat diameter Td have been identified to optimize pressure drop through the circuit 100. A series of design experiments were conducted to identify the optimal values and ratios of these dimensions wherein the ratios were identified to maintain optimal emitter efficiency Ef.

The more efficient the circuit can turn linear flow in to rotational flow, the larger the pressure drop. The convergence angle CA should be somewhere between 45° to 70° or 80°. Between these angles, the k value used to calculate the emitter efficiency Ef does not change a great deal. The spatial efficiency of the circuit, the aim of the flow, and conditioning are all affected by the convergence angle CA. The convergence angle CA and interaction region diameter IRD may affect the overall circuit length as it may be desirable to place a plurality of vortex chambers 130 along a surface of the circuit 110 in close proximity to one another. In one embodiment, it may be desirable to fit the largest number of vortex chambers 130 allowable on the circuit 110. In this embodiment, the convergence angle CA may be sufficiently large enough that the total length of the vortex chamber 130 is short. The spacing between chambers 130 may be set by the length of each chamber 130 so the angle may be as large as possible without placing the chambers 130 too close to each other.

The convergence angle CA may be large enough so that the aim and conditioning are such that the highest pressure attenuation for the package size may be achieved. Small angles (below) 45° and large angles (80° may reduce the pressure attenuation of the circuit. Small angles may not aim the flow enough towards the wall of the vortex chamber 130 and away from the power nozzle 150 and throat 170. Small angles also may have a much larger footprint decreasing the emitter efficiency Ef value. Large angled may slow the flow down and force it too much to the outside and the vortex may not be as powerful.

The inlet region 140 may converge towards the power nozzle 150 along the chamber walls 132 defined by the convergence angle CA. The power nozzle 150 may have the same depth as width (Pw=Pd). A square power nozzle may provide the largest minimum dimension for the area, and has better flow conditioning. A power nozzle width Pw that is larger makes it harder to avoid losing vorticity as the flow may be directed straight into the throat. A power nozzle width Pw that is smaller may affect the flow conditioning going into the chamber 130, reducing its efficiency. In one embodiment, the power nozzle 150 may have no straight length to it. Having a large convergence angle CA may allow for a corresponding large region on the exit of the throat 170. The sudden expansion may have a small, but not insignificant pressure drop. One wall of the converging angle CA meets with the interaction region 160 tangentially at the power nozzle 150. The other side of the power nozzle 150 is a round apex 152 where the convergent angle CA and the interaction region 160 meet. This round portion or apex 152 may be as small as manufacturing processes constraints such as molding or additive manufacturing may allow as a small apex 152 may provide a higher velocity and give improved system performance.

The inlet region 140 may be considered a converging passage that communicates with the interaction region 160 which may be a circular chamber with a hole or throat 170 in the center. The converging passage aims the flow of the circuit 130 mostly tangentially with some aim towards the wall 132 to create a vortex in the interaction region 160 that creates pressure attenuation by dissipating energy through the angular momentum of the vortex flow created by the geometry of the chamber walls 132. This configuration may also be responsible for the pressure regulation. As the pressure increases, the loss of pressure due to the angular momentum increases and reduces the measured exponent of the circuit 110. The interaction region diameter IRD to power nozzle width Pw may be about 2:1 to 3:1 but more specifically may be about 2.15:1.

If the interaction region diameter IRD were smaller than about (2:1) the vorticity may be lost, and a larger ratio than about (3:1) may make the area increase at a faster rate than the pressure drop. The small circuit size may be space efficient and allow a larger number of vortex chambers 130 to be configured in a small package. The throat 170 may be a minimum dimension of 0.8 mm in diameter to avoid clogging. It may be small enough that the flow doesn't directly enter the throat 170 lowering the vorticity of the circuit 110.

The vortex assembly 100 may include the circuit 110 and additional components to sufficiently communicate pressurized fluid from a tube 300 through the vortex emitter assembly 100 and to spray fluid at a desired rate to the environment. FIGS. 8-15 illustrate the vortex emitter assembly 100 that includes the described vortex circuit 110. In one embodiment, the circuit 110 is attached to a backing plate 250 along a fluid facing side within the tube 300 and a support place 260 along the opposite side of the circuit 110 to support the vortex emitter assembly 100 along an inner surface 302 of the tube 300.

The backing place 250 may be attached to the circuit 110 with a plurality of fasteners that may extend through bore holes 252 and establish the fluid passages defined by the vortex chambers 130 in the circuit 110. In one embodiment, the filter component 210 may be a three dimensional configuration that may protrude from the circuit 110 and be exposed to interior of the tube 300 (as illustrated by FIG. 1). Here the filter component 210 may be in direct communication with the pressure compensating component 230 and subsequently, the pressure reducing component 220 (i.e. the plurality of vortex chambers 130). Alternatively, the filter component 210 may be positioned along the support plate 250 as illustrated by FIGS. 8-15. The filter component 210 may allow for fluid communication with the circuit 110 from fluid that flows through the tube 300. The filter component 210 may be in fluid communication with an inlet portion along the support place 250 to communicate with the circuit and plurality of vortex chambers 130. A protruding 3D filter component may keep the fluid entrance to the circuit towards the interior of the pipe and away from a level at which grit and debris settle when the system is not running. The filter component 210 may protrudes through the backing plate 250 in this configuration (not shown) or may be positioned along the backing plate 250 towards the bulk flow region that has a higher velocity flow than at the edges of the tube 300. This helps prevent debris from entering the system.

Figure 14:
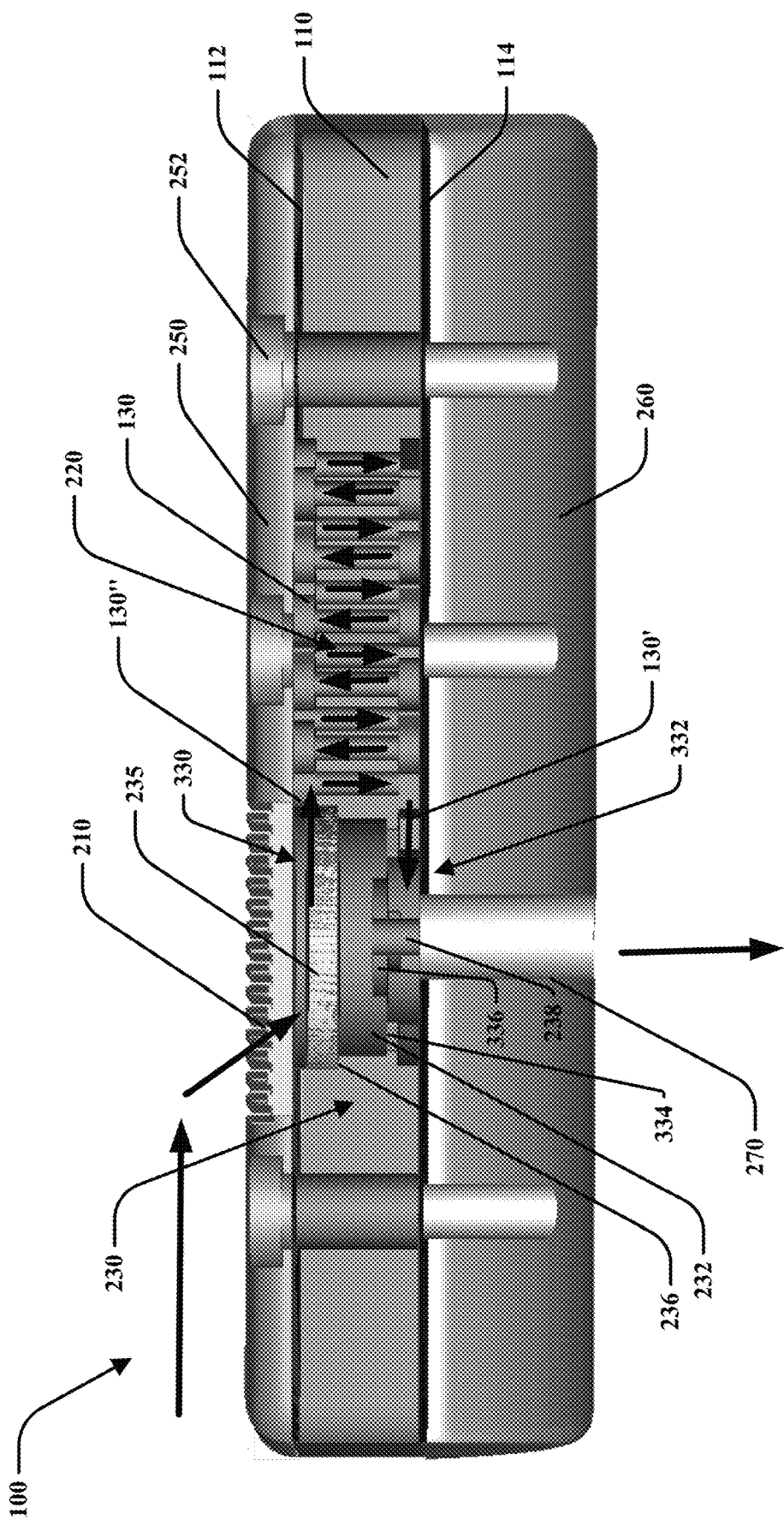
FIG. 14 is a cross sectional view of an embodiment of the vortex emitter assembly in accordance with one embodiment of the present disclosure of FIG. 8.
Figure 15:
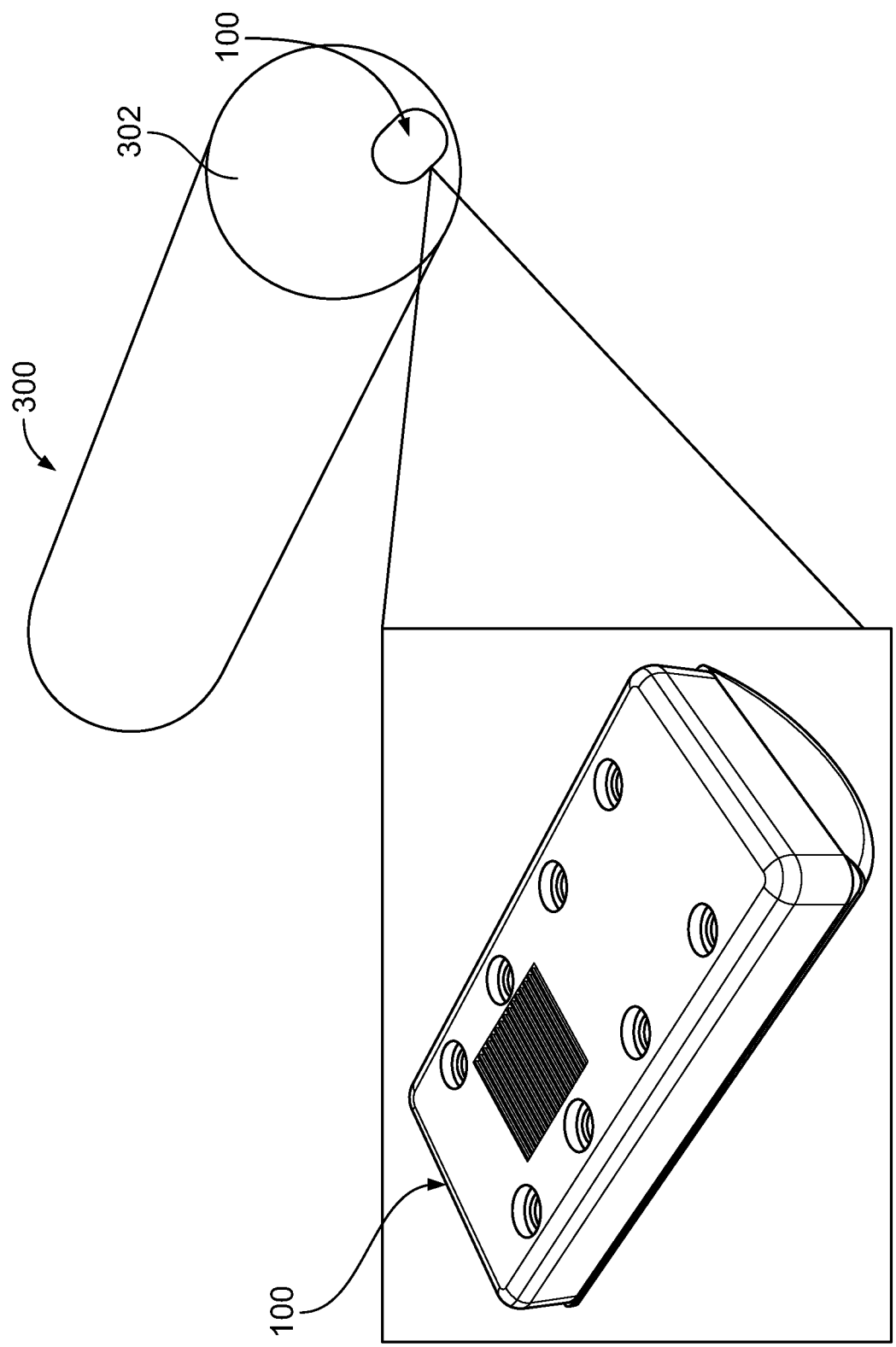
FIG. 15 is a schematic view of an embodiment of the vortex emitter assembly positioned within a pipe according to the present disclosure.

In operation, fluid may flow through the assembly 100 from an assembly inlet at the filter component 210, the pressure reducing element 220 and the pressure compensating device 230 prior to being sprayed from the outlet 270 to the environment. FIG. 14 illustrates one example of the operation of the instant application wherein arrows identify the flow of fluid through the assembly 100. Fluid may first enter through the filter component 210 to remove debris or grit from the fluid. The fluid may then flow to abut against the fluid facing side (top) of the diaphragm 235 of the pressure compensating component 230. The fluid then enters the pressure reducing component 220 that comprises the series of vortex chambers 130 aligned along the first side 112 and second side 114 of the circuit 110. The flow may travel through the inlets 180 and throats 170 of the plurality of vortex chambers 130 through the inlet regions 140, power nozzles 150 and interaction regions 160 therein creating vorticity flow and reducing fluid pressure by providing some head loss k. Once through the plurality of vortex chambers 130 the flow may enter into the pressure compensating component 230 at an opposite (bottom) side of the diaphragm 235. The pressure compensating component 230 may provide a pressure difference that results in the deformation of the diaphragm to form a small opening between the deformed diaphragm and an exit hole 238 which is designed to supply a remainder of the head loss to achieve a desired flow rate. The flow may then be distributed through the outlet 270 to environment.

The performance of the disclosed assembly has been optimized based on the coefficient of emitter efficiency Ef. This parameter is maximized by geometry which produces a large head loss Kl despite having a large minimum flow area Amin and a small total area Ackt. The vortex chambers 130 function by accelerating fluid through its passage defined by the convergence angle CA, leading to a minimum cross-sectional area referred to as the power nozzle 150. The linear velocity of the fluid exiting the power nozzle 150 is forced to rotate within the circular interaction region 160 before exiting through a concentrically located circular throat 170 and then entering into a subsequent inlet region 140 of the next vortex chamber 130.

In one embodiment, as illustrated by FIGS. 2, 3, and 14, the circuit 110 may include a portion of the pressure compensating component 230 defined within the unitary body 120 and in communication with the plurality of vortex chambers 130. The pressure compensating component 230 may include a recessed area 232 with a shoulder 236 for receiving the diaphragm 235. The diaphragm 235 may separate the recessed area 232 into a first zone 330 in communication with the first side 112 of the circuit 110 and a second zone 332 in communication with the second side 114 of the circuit 110. A base surface 334 may exist along the second zone 332 and include a plurality of radially positioned apertures 236 that are spaced from an exit hole 238 that is aligned with the outlet 270. Here, the outlet 270 may be defined in the support plate 260 and the support plate 260 may be attached to the opposite side of the circuit 110 than the backing plate 250. The diaphragm 235 may deflect towards the exit hole 238 within the second zone 332 of the recessed area 232 during operation and may throttle the flow of fluid and pressure level as fluid egress through the exit hole 238. The exit hole 238 may be positioned within a pedestal 336 on the base surface 334 within the second zone 332 and a channel or weir 338 may be defined within the pedestal 336 to allow fluid communication between the second zone 332 and the exit hole 238. This may assist with pressure and fluid flow regulation when the diaphragm 235 has been deflected to abut against the exit hole 238. This configuration may allow for the proper function and regulation of fluid flow and pressure through the assembly 100 and provide an exponent value of about 0.

The plurality of radially positioned apertures 236 may allow for fluid to flow within the second zone 332 between the bottom side of the diaphragm 235 and the support plate 260 to allow fluid to find its way through the weir 338 and exit hole 238. The outlet 270 of the support plate 260 may be aligned with the exit hole 238 and a hole (not shown) along the tube 300 for fluid to be sprayed to environment.

Figure 16:
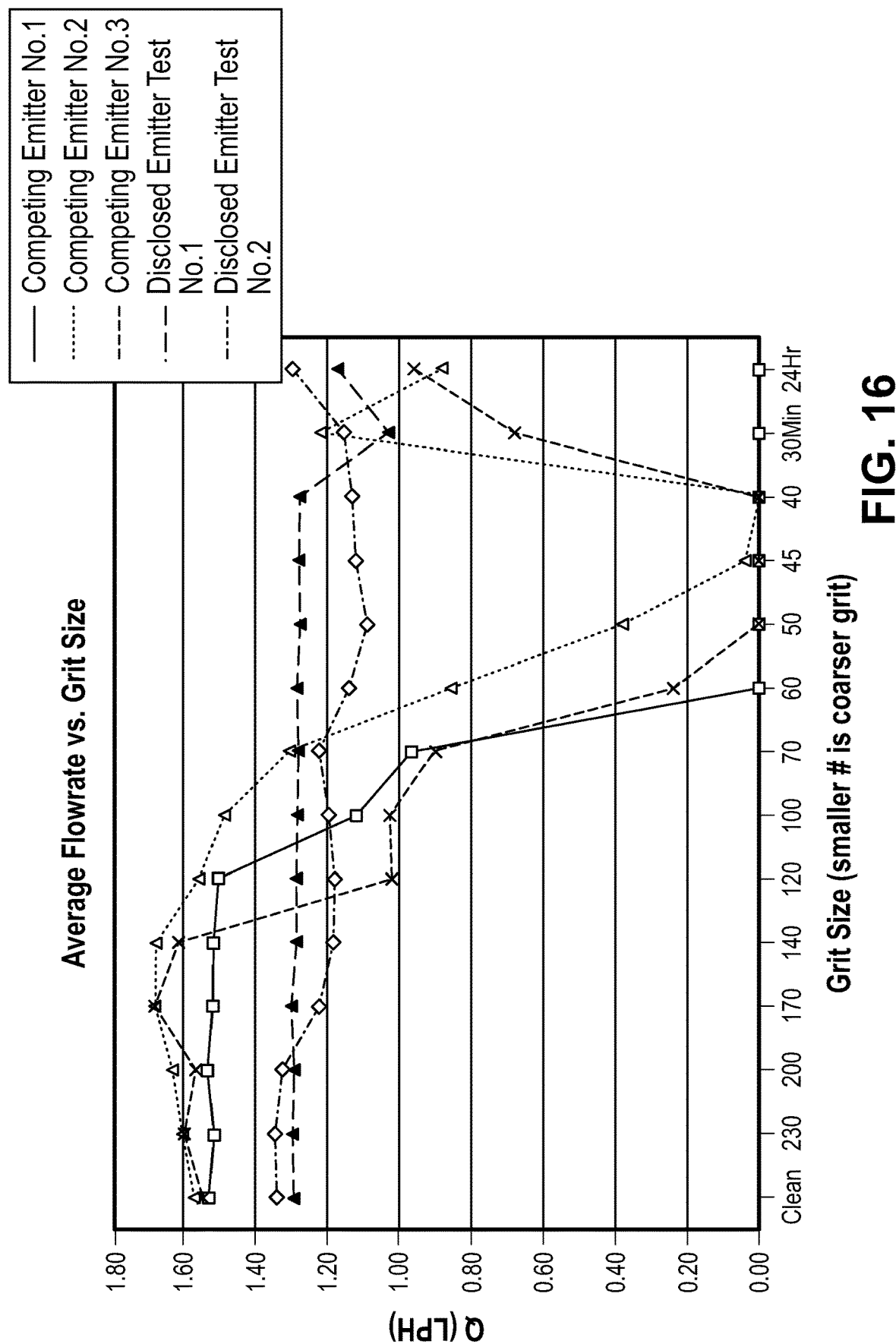
FIG. 16 is a graph illustrating the average flowrate vs. grit size tested for several competing emitter devices as well as the disclosed emitter assembly.

FIG. 16 illustrates a graph resembling test data identifying an average flow rate vs. grit size for four different irrigation emitter assemblies. This "grit test" is an industry standard performance test measuring the pressure and flow relationships and clog resistance. It involved recirculating fluid through a sample of emitters and sequentially adding larger particles of grit having a grit concentration of 250 PPM at a time wherein the fluid to eventually achieved a final concentration of about 2750 PPM while operating at 1.5 LPH at 15 psi flow range. The first three graph lines represent tests performed using irrigation emitter assemblies that are known assemblies labeled "Competing Emitters No. 1, No. 2, and No. 3." These assemblies are currently available on the market today and do not include the features described in the present disclosure including the vortex circuit 110. The fourth and fifth graph lines represent two tests performed of the instant emitter assembly including the vortex circuit 110 described above and labeled "Disclosed Emitter Tests No. 1, and No. 2." The graph represents the average flowrate measured through the assemblies as various sizes of grit or particulate have been added to the fluid over time. The y-axis represents average flow rate Q in liters per hour (LPH) and the x-axis represent girt size wherein the smaller number illustrates a coarser grit value. As shown by the graph of FIG. 16, the graph lines identify that as the grit size increased grew coarser for competing emitters No. 1, 2, and 3, the average flowrate Q dropped precipitously after about 140 to about 70 grit size. Comparatively, the Disclosed Emitter Tests No. 1 and No. 2 illustrate that the average flowrate for the instant emitter assembly 100 that includes the vortex circuit 110 of the instant application performed having a relatively constant average flow rate as grit size increased over time. The measured average flow rate Q was measured to be about 1 LPH to about 1.4 LPH over time. Notably, measurements were taken every 30 minutes as additional grit having an increasingly coarser measurement was introduced into the flow of fluid during these tests.

Figure 17:
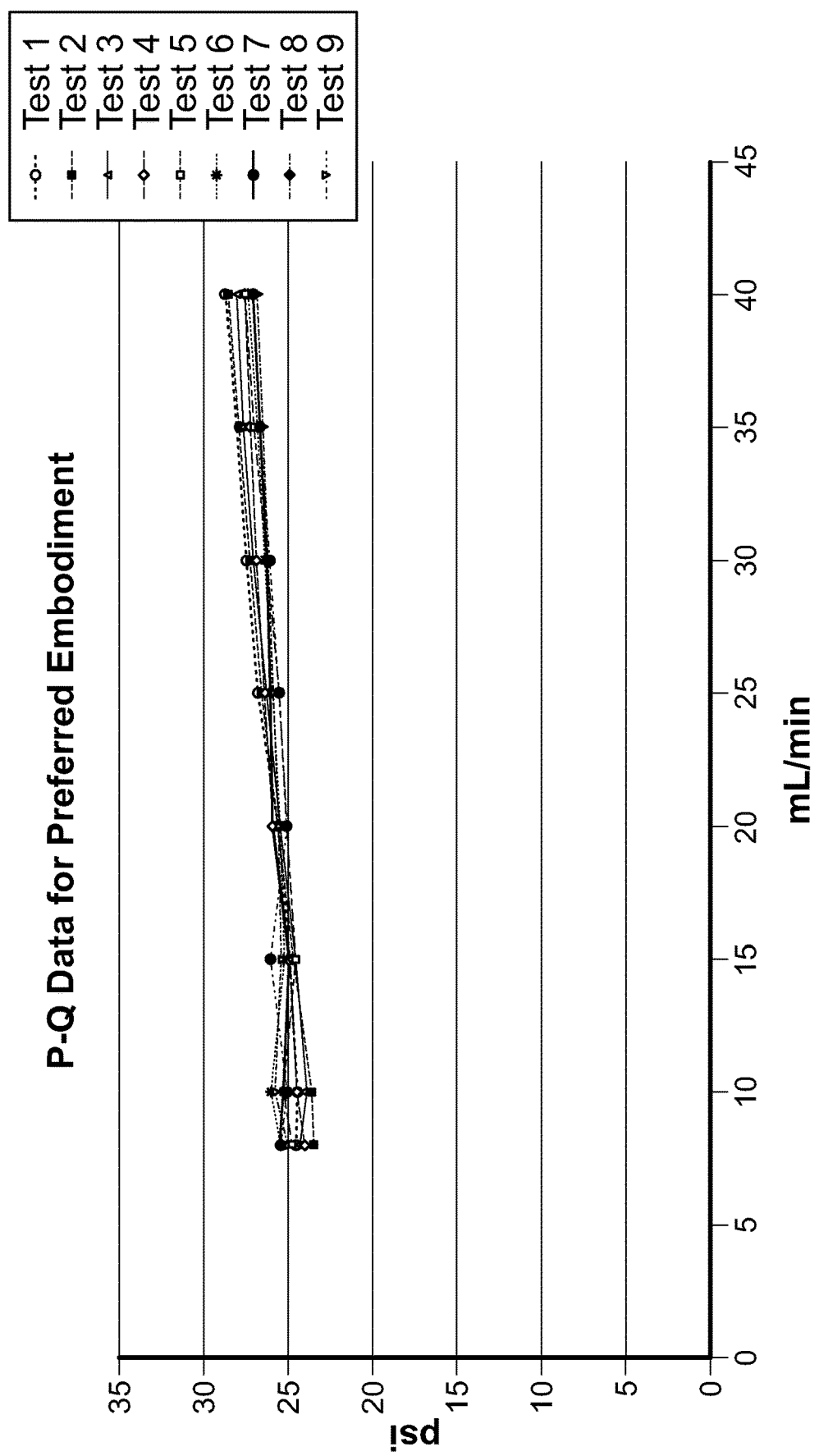
FIG. 17 is a graph illustrating pressure (P) and flow rate (Q) data for embodiments of the disclosed emitter assembly including pressure compensating device.

FIG. 17 illustrates a graph that displays various tests of the vortex emitter assembly 100 that includes the vortex circuit 110 of the present disclosure and includes the pressure compensating component 230. This graph is a P-Q graph that identifies pressure and average flow rate of the measured assemblies 100. This data illustrates that for nine (9) different tests of various prototypes of the present assembly 100 the level pressure (psi) measured at the outlet of the assembly 100 was able to be maintained at a relative constant level over a broad range of flow rates Q (mL/min). Here, each of the measured prototypes maintained a flowrate between about 23 psi to 28 mL/min as pressure increased from about 5 psi to about 40 psi.

Although applicant's testing data shows that in a single vortex 130 the emitter efficiency Ef value may be larger for a larger interaction region diameter IRD, the minor head losses of the circuit may occur as flow through the power nozzle 150 entering the interaction region 160, flow going from the interaction region 160 to the throat 170, flow going from the throat 170 to the exit diameter and either various static bends that flow must go through to exit the assembly or to a pressure compensating device 230—each of which may add up to a non-insignificant pressure drop. The circuit may be a balance of all these effects, not just the vorticity of the circuit, but additional head losses.

As noted above, the vortex emitter assembly 100 of the present disclosure may be created as an injection molded component. It may be static, with no moving parts or may be dynamic, having a pressure compensating device to assist with pressure manipulation. The vortex emitter assembly 100 may be attached to an inner side of the tube 300 and may be inserted and attached as the tube is extruded as part of a drip irrigation system. The drip irrigation assembly's tube 300 may be placed in a farm field and water may be pumped in. The emitter assemblies 100 may take the high pressure flow inside the tube and produce a desired flowrate (selectable depending on the requirements of the environment, terrain or plant being irrigated).

The vortex emitter assembly 100 of the present disclosure and the disclosed pressure reducing elements 220 provide a higher efficiency than traditional pivot or sprinkler systems. The emitters 100 not only provide the appropriate pressure attenuation; they resist clogging from the grit and debris in available ground water. In accordance with the present disclosure, newly developed prototype clog resistant in-line vortex element irrigation emitter gives a greater pressure attenuation for its physical dimensions than comparable devices in the prior art (as described above). The large dimensions and the vortex created in each chamber 130 help flush debris and grit through the system. The smaller circuit package along with the natural coring that occurs with the vortex circuit of the present disclosure saves on circuit size. This saves irrigation assembly cost, and allows for parts to be used in thinner walled tubing as the inner wall tubing requires a smaller mass to heat for bonding circuits.

The vortex circuit of the present disclosure naturally pressure regulates. The circuit 110 optimizes exponent rating. The exponent of an optimized vortex circuit of the present disclosure can reach as low as 0.3 versus a standard (prior art) orifice which has an exponent of 0.5. What this means for the flow is that as the pressure increases, the change of flow only increases a small amount.

Figure 18:
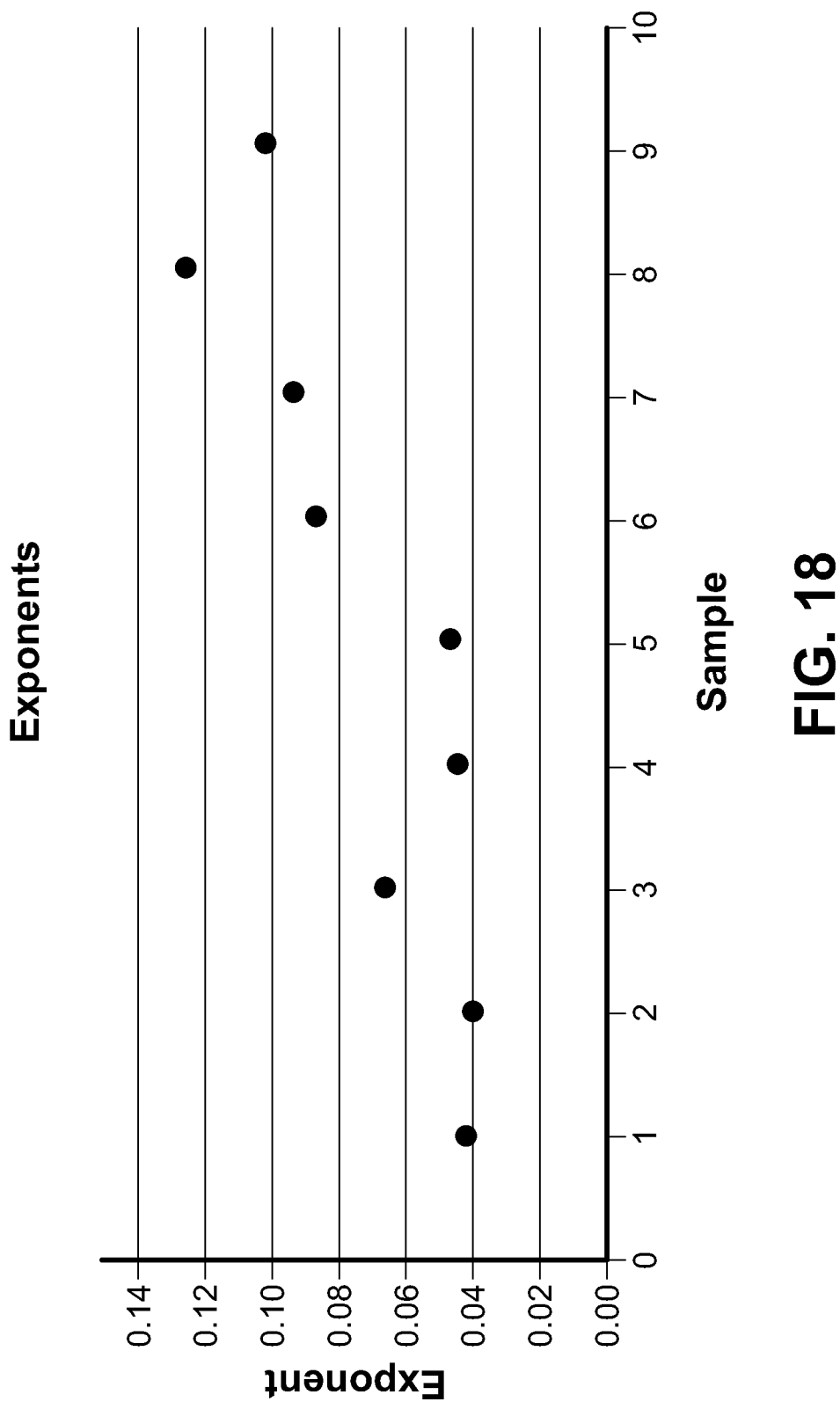
FIG. 18 is a graph illustrating exponent values of the embodiments of the graph of FIG. 17.

FIG. 18 illustrates a graph that displays the measured Exponent values that corresponds to the various tests of the prototypes of the vortex emitter assembly 100 identified by FIG. 17. Here each of the tested prototypes were identified to include an exponent value that was less than about 0.14 and was as low as about 0.04. The addition of the pressure compensation component 230 to the pressure reducing component 220 of the instant disclosure gives an exponent of about 0 so that for any change in pressure, the circuit doesn't increase in flow. The vortex circuit 110 of the present disclosure may be used in communication with a pressure compensation PC component 230 that includes a diaphragm 235. However, the circuit 110 may also be used in an assembly 100 without pressure compensation PC component 230 in which the relevant range of irrigation fluid pressures and flows, the 0.3 exponent range should be sufficient to prevent over-watering the desired environment. This device does allow for pressure compensation to be added, but for naturally flowing circuits with no PC, the low exponent of the vortex circuit 110 offers a blend of flow control and cost in a non-PC part.

While in accordance with the patent statutes the best mode and certain embodiments of the disclosure have been set forth, the scope of the disclosure is not limited thereto, but rather by the scope of the attached. As such, other variants within the spirit and scope of this disclosure are possible and will present themselves to those skilled in the art.

Although the present embodiments have been illustrated in the accompanying drawings and described in the foregoing detailed description, it is to be understood that the vortex emitter assemblies are not to be limited to just the embodiments disclosed, but that the systems and assemblies described herein are capable of numerous rearrangements, modifications and substitutions. The exemplary embodiment has been described with reference to the preferred embodiments. Obviously, modifications and alterations will occur to others upon reading and understanding the preceding detailed description. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vortex emitter assembly for an in-line irrigation tube comprising:
    a unitary body defining an inlet on a first surface of the unitary body, an outlet on a second surface opposite the first surface and a multi-lumen flow channel therebetween providing fluid communication between the inlet and the outlet;
    wherein said unitary body is configured as a double-sided circuit and a plurality of vortex chambers with lumens aligned in series;
    each vortex chamber of said plurality of vortex chambers includes an inlet region, a power nozzle, an interaction region and a throat, the inlet region is in fluid communication with the interaction region through the power nozzle, the power nozzle is defined by an opposite wall that extends between the inlet region and the interaction region and an apex; and
    a convergence angle defined by a perimeter wall of each said vortex chamber that extends from the apex of the power nozzle along the inlet region and the opposite wall along the inlet region, wherein said convergence angle is between about 45° to about 80° such that the inlet region has a different shape than the interaction region along the convergence angle;
    wherein said plurality of vortex chambers include dimensions to create a pressure drop of fluid flow and wherein the vortex emitter assembly is configured to be attached to an inner surface of an in-line irrigation tube so that the second surface is facing the inner surface of the in-line irrigation tube.

2. The vortex emitter assembly of claim 1, wherein the apex is round.

3. The vortex emitter assembly of claim 1, wherein said convergence angles of said plurality of vortex chambers and lumens are optimized and configured to create converging vortices and flows.

4. A vortex emitter assembly for an in-line irrigation tube comprising:
    a vortex circuit having a unitary body including a double sided circuit having a plurality of vortex chambers with multi-lumen flow channels therebetween providing fluid communication between an inlet on a first surface of the unitary body and an outlet on a second surface opposite the first surface of the unitary body;
    at least one vortex chamber of the plurality of vortex chambers includes an inlet region, a power nozzle, an interaction region and a throat having dimensions to create a pressure drop of fluid flow therein; and
    wherein a convergence angle is defined by a perimeter wall of said at least one vortex chamber that extends from an apex of the power nozzle along the inlet region and an opposite wall along the inlet region, wherein said convergence angle is between about 45° to about 80° such that the inlet region has a different shape than the interaction region; wherein said vortex emitter assembly is configured to be attached to an inner surface of an in-line irrigation tube so that the second surface is facing the inner surface of the in-line irrigation tube.

5. The vortex emitter assembly of claim 4 further comprising a filter component and a pressure compensating component.

6. An in-line irrigation tube system comprising at least one vortex emitter assembly of claim 4, further comprising a tube having an inner surface wherein a plurality of vortex emitter assemblies are positioned along said inner surface of said tube.

7. The vortex emitter assembly of claim 4, wherein said convergence angle is about 55°.

8. The vortex emitter assembly of claim 4 wherein said power nozzle includes a width (Pw) and a depth (Pd) wherein said power nozzle width (Pw) includes a ratio with said power nozzle depth (Pd) that is in the range of about 0.75:1 to about 1.25:1.

9. The vortex emitter assembly of claim 8 said power nozzle width (Pw) includes a ratio with said power nozzle depth (Pd) that is about 1:1.

10. The vortex emitter assembly of claim 4 wherein said interaction region includes a diameter (IRD) and the power nozzle includes a width (Pw) wherein said interaction region diameter (IRD) includes a ratio with said power nozzle width (Pw) that is in the range of about 2:1 to about 3:1.

11. The vortex emitter assembly of claim 10 wherein said ratio between said interaction region diameter (IRD) and said power nozzle width (Pd) is about 2.15:1.

12. The vortex emitter assembly of claim 4, wherein said interaction region includes a diameter (IRD) and the throat includes a diameter (Td) wherein said interaction region diameter (IRD) includes a ratio with said throat diameter (Td) that is in the range of about 1.49:1 to about 3.89:1.

13. The vortex emitter assembly of claim 12, wherein said ratio between said interaction region diameter (IRD) and said throat diameter (Td) is about 2.69:1.

14. A vortex emitter assembly for an in-line irrigation tube comprising:
    a backing plate;
    a vortex circuit having a unitary body with a plurality of vortex chambers defined along a first surface and a plurality of vortex chambers defined along a second surface opposite the first surface;
    wherein each vortex chamber of the plurality of vortex chambers includes an inlet region, a power nozzle, an interaction region and a throat having dimensions to create a pressure drop of fluid flow therein;
    wherein a convergence angle is defined by a perimeter wall of at least one of the vortex chambers that extends from an apex of the power nozzle along the inlet region and an opposite wall along the inlet region, wherein said convergence angle is between about 45° to about 80° such that the inlet region has a different shape than the interaction region;

a support plate; wherein the backing plate is attached to the first surface of the vortex circuit and the support plate is attached to the second surface of said vortex circuit;

a filter component in fluid communication with the vortex circuit; and a pressure compensating component in fluid communication with the vortex circuit;

wherein said vortex emitter assembly is configured to be attached to an inner surface of an in-line irrigation tube so that the second surface is facing the inner surface of the in-line irrigation tube.

15. The vortex emitter assembly of claim 14, wherein said power nozzle includes a width (Pw) and a depth (Pd), and wherein said power nozzle width (Pw) includes a ratio with said power nozzle depth (Pd) that is in the range of about 0.75:1 to about 1.25:1.

16. The vortex emitter assembly of claim 14, wherein said interaction region includes a diameter (IRD) and the power nozzle includes a width (Pw), and wherein said interaction region diameter (IRD) includes a ratio with said power nozzle width (Pw) that is in the range of about 2:1 to about 3:1.

17. The vortex emitter assembly of claim 14, wherein said interaction region includes a diameter (IRD) and the throat includes a diameter (Td), and wherein said interaction region diameter (IRD) includes a ratio with said throat diameter (Td) that is in the range of about 1.49:1 to about 3.89:1.

* * * * *